United States Patent  [10] Patent No.: US 6,654,055 B1
Park et al.  (45) Date of Patent: Nov. 25, 2003

(54) METHOD FOR DETECTING THE ILLUMINATION COLOR OF A COLOR IMAGE FROM AN AVERAGE OF CHROMATICITY COORDINATES GENERATED FROM LINEAR APPROXIMATIONS OF COLOR TRANSITION BANDS

(75) Inventors: Du-Sik Park, Suwon (KR); Chang-yeong Kim, Euiwang (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/065,723

(22) Filed: Apr. 24, 1998

(30) Foreign Application Priority Data

Apr. 28, 1997 (KR) .............................................. 97-15844

(51) Int. Cl.[7] .............................. H04N 9/64; G06K 9/00
(52) U.S. Cl. ........................ 348/242; 358/522; 382/164
(58) Field of Search ........................ 348/207, 222–229, 348/234–238, 254–256, 272, 273, 278, 279, 280, 618, 619, 621, 625, 630, 631, 643–646; 382/162, 164, 167, 168, 171, 260, 264, 266, 274; H04N 3/14

(56) References Cited

U.S. PATENT DOCUMENTS

| | | | | | |
|---|---|---|---|---|---|
| 4,685,071 A | * | 8/1987 | Lee | ............................ | 382/162 |
| 5,023,704 A | | 6/1991 | Hieda et al. | ................ | 348/227 |
| 5,130,935 A | * | 7/1992 | Takiguchi | .................... | 382/167 |
| 5,317,678 A | * | 5/1994 | Okawara | .................... | 345/426 |
| 5,495,428 A | * | 2/1996 | Schwartz | .................... | 382/164 |
| 5,809,165 A | * | 9/1998 | Massen | ...................... | 382/168 |
| 5,825,916 A | * | 10/1998 | Denber | ...................... | 382/162 |
| 5,959,720 A | * | 9/1999 | Kwon | ......................... | 355/38 |
| 6,104,830 A | * | 8/2000 | Schistad | .................... | 382/167 |
| 6,249,601 B1 | * | 6/2001 | Kim | ........................... | 382/162 |

OTHER PUBLICATIONS

Klinker, et al., "The Measurement of Highlights in Color Images," *Int. J. of Computer Vision*, 2, 7–32, 1988.
Shafer, "Using Color to Separate Reflection Components," *Color Res. & App.*, 10:210–218, 1985.

* cited by examiner

*Primary Examiner*—Ngoc-Yen Vu
(74) *Attorney, Agent, or Firm*—Burns, Doane, Swecker & Mathis, L.L.P.

(57) ABSTRACT

A method for detecting the illumination color to store the color-compensated image considering the light effect of illumination environments on photographing with a color image input apparatus such as a video camera. The present invention provides a method for finding highlight areas appearing on the objects in the image and obtaining the illumination color resulting from the analysis of the color of the pixels included in those highlight areas. The chromaticity coordinates of the pixels in a highlight area occurring on the uniformly colored object are distributed between the body color of the object and the illumination color. The distribution of those chromaticity coordinates is referred to as the color transition band. The straight lines are approximated on the chromaticity diagram using these color transition bands obtained from highlight areas presenting several uniformly colored objects. The illumination color is determined as the average of the intersections between the lines. In this way, the present invention may reduce the excessive processing time found in the prior art method, providing more reliable information about the illumination color.

10 Claims, 5 Drawing Sheets

METHOD FOR DETECTING THE ILLUMINATION COLOR OF A COLOR IMAGE FROM AN AVERAGE OF CHROMATICITY COORDINATES GENERATED FROM LINEAR APPROXIMATIONS OF COLOR TRANSITION BANDS

FIELD OF THE INVENTION

The present invention relates to a method for detecting the illumination color to store the color-compensated image, considering the effect of the illumination environment on photographing in the color image input apparatus, and particularly for detecting the accurate illumination color derived from the image from the color image input apparatus.

DESCRIPTION OF THE RELATED ART

Up to now many methods are well known for performing compensation of the color such as a white balance in a color image input apparatus such as a digital camera.

It is essential to detect the illumination color or the Spectrum Power Distribution (SPD) of illumination as the illumination component in circumstances such as robot vision systems made to recognize and determine objects under various circumstances of light. It is necessary because the color of the object looks different according to the light.

An accurate method is required for detecting the components of light so as to find the accurate color compensation or to find the results of recognition derived from the image from the image input apparatus.

The methods for performing white balance or color compensation by the prior art include:

a method of performing white balance referring to illumination color found in general in the photographing of a white plate (or paper) before photographing, in the case of a video camera;

a method of using a camera device with a built-in sensor for detecting the components of illumination emitted from the direct light;

a method of detecting the components of illumination by using a camera having particular hardware, the way to determine the light being based on pushing a button placed in the camera corresponding to the specific light determined by users; and a method of finding the illumination color from the image itself.

But when a camera device with a built-in sensor as noted above is used, there are problems of application to the image derived from long-distance photographing where the camera is unable to deal with the problems by the hardware directly. In addition, there is a burden of additional expense due to the attachment of additional hardware. Also there exists a problem of the need for many buttons to correspond to the various components of light in the buttons determined by user.

U.S. Pat. No. 4,685,071 discloses a method of finding the illumination color from the image itself as a solution to resolve problems in the previous methods. The object of the Lee process is to detect the illumination color directly from the color image signal. The Lee process has the advantage of a reduction in the manufacturing expenses of the image input apparatus because it is not necessary to add any hardware devices, such as a detector for the illumination color. In the Lee process the pixel is provided as a color boundary pixel, of which the color varies more than the specific magnitude based on the level of color variation at the front of image. It approximates linearly on chromaticity coordinates from the selection of the set of pixels on either side of each pixel of a color boundary, and determines if the relevant pixel represents the boundary of color derived from a body color of object and a highlight. The illumination color is determined based on the Hough conversion and the linear approximation of the set of pixels around the pixels of a color boundary derived from a color of a body in an object and a highlight. Namely the illumination color is determined by detecting the specularly reflected light from the scene in the image.

The specularly reflected light can be detected by detecting the set of points representing the same hue and the variable saturation on each object with different surface color in the image.

For the purpose of detecting the independent variation of color on brightness, the image is converted to a color space with a chromaticity coordinate. The color boundary is detected for which chromaticity and hue vary the most steeply, and the set of data around that color boundary by the variation of chromaticity are used.

The chromaticity coordinate is represented with a 2-dimensional coordinate system for each r and g converted from a 3-dimensional coordinate system for each R, G and B, and generally used in the field of chromatics.

In this case, for the purpose of distinguishing if a boundary was made by the variation of chromaticity or by the variation of hue, it approximates linearly by collecting the set of data on both sides of a boundary point. The boundary is determined to be made by chromaticity when the slopes of the line derived from the sets of data collected from both sides are the same as each other, and the data set becomes a data set for detecting the illumination color. It is then possible to find a variable determining the illumination color from the path of intersection points derived across the lines from many sets of data around the boundary point by the variation of chromaticity.

But the big problem of method stated above is that it demands excessive running time for collection of the set of data and for approximation.

The problems of the method stated above are that it is difficult to collect data of both sides from the data of a boundary point, and it should repeat actions of collecting the set of data at a great many boundary points by means of processing data by the unit of boundary point and actions of determining as well as comparing those with each other by means of approximation to a straight line. That is to say, it takes a lot of running time to process the edge points by units of pixels.

The other prior art is disclosed in U.S. Pat. No. 5,023,704. This prior art is a device for detecting the color-temperature of illumination with a built-in sensor for detecting multilevel components of color involved in the incident light. It is easy to correspond to the variations of illumination colors around the sensor. However, the accuracy of the color-temperature of detected illumination decreases if the photographed scene becomes more distant from the input apparatus. This prior art is comprised of a detector detecting multilevel color components involved in the incident light, a comparator comparing multiple reference levels with each color component, and a controller modifying the reference level according to detected illumination level. This prior art has a problem in that illumination colors from an image can be detected only if a detector as noted above exists.

SUMMARY

The invention is intended to solve the above described problems, and one object of the present invention is to provide a method for getting faster processing and more exact illumination color comprising the steps of:

finding color transition bands from the whole image, performing linear approximation from chromaticity coordinates of the pixels involved in the color transition bands, and determining the average of intersections of the straight lines and setting the average as the illumination color.

To achieve the above object, the invention provides a method to detect illumination color from a color image signal comprising steps of:

inputting the color image signal from an image input apparatus;

removing saturated signals, signals with low brightness, and signals with high chroma from the color image signal, i.e., setting their values to 0;

performing multistage median filtering to remove noise using maintenance of the edge information from images;

transforming color signals of R, G, and B of all pixels of the input color image signal into the chromaticity coordinates;

calculating the magnitude of the gradient to get color edges from chromaticity coordinates of images;

determining color transition bands (CTB) as approximated lines;

calculating eigen values and eigen vectors of each color transition band;

determining if the ratio of a bigger eigen value (BEV) to the total variance (RBEV) is larger than a first predetermined limit condition;

determining if the absolute magnitude of BEV (AMBEV) is larger than a second predetermined limit condition;

finding the linear approximation equation of the color transition band using the eigen vector corresponding to the BEV;

confirming if all color transition bands have been processed;

calculating all intersection points between each other pair of two lines of the approximated lines; and determining the average chromaticity coordinates of the intersection points of each pair of two lines for which the product of the slopes is negative as the illumination color.

In the process according to the present invention, it is preferable that a signal with low brightness is the signal where brightness (Y)<50 and Y=(R+G+B)/3, and the signal with high chroma is the color signal outside the 0.6 PCC triangle on the r–g chromaticity diagram, and a saturated signal is the signal of which the value for any one of R, G, and B elements is 255. It is preferable that a PCC triangle defined as $$PCC = \frac{\overline{CA_r}}{\overline{CM_r}} = \frac{\overline{CA_g}}{\overline{CM_g}} = \frac{\overline{CA_o}}{\overline{CM_o}}$$

is the triangle which links $A_r$, $A_g$, and $A_o$ points determined according to the magnitude of a specific PCC, where a central point on the r–g chromaticity diagram is C(0.333, 0.333), the maximum points of the r–g coordinates are $M_r(1,0)$ and $M_g(0,1)$, the origin is $M_o(0,0)$, and the segment linking those points and each point on the segment is defined as follows:

$\overline{CM_r}$ is the segment linking the C and the $M_r$, $\overline{CM_g}$ is the segment linking the C and the $M_g$, $\overline{CM_o}$ is the segment linking the C and the $M_o$, $\overline{CA_r}$ is the segment linking the $A_r$ and C for any point $A_r$ on the segment linking C and $M_r$, $\overline{CA_g}$ is the segment linking the $A_g$ and C for any point $A_g$ on the segment linking C and $M_g$, and $\overline{CA_o}$ is the segment linking the $A_o$ and C for any point $A_o$ on the segment linking C and $M_o$.

According to one embodiment of the present invention the process is comprised of following steps:

finding the magnitudes of all of the gradients of pixels in the input image;

normalizing the magnitude of the gradient;

quantizing the magnitude of the normalized gradient; and making the image of the gradient as a magnitude of the quantized gradient.

According to one embodiment of the present invention, it is preferable that the equation is given as $MoG(x,y)=[e_r(x,y)+e_g(x,y)]/2$ to get the gradient for all of the pixels, where the gradient is $\nabla f(x,y)=[\partial f/\partial x \ \partial f/\partial y]^T \equiv [f_x, f_y]^T$ for any position (x,y) in the image, the magnitude of the gradient is $e(x, y)=\sqrt{f_{x^2(x,y)}+f_{y^2(x,y)}}$, and the magnitude of the gradient is $e_r(x,y)$ or $e_g(x,y)$ for each r, g respectively.

According to one embodiment of the present invention, it is preferable that the equation to normalize magnitudes of the gradients is given as $RMG(x,y)=MoG(x,y)/MaxMoG$, where MaxMoG is the maximum multitude gradient in the overall image, and MoG(x,y) is the gradient for all pixels.

According to one embodiment of the present invention, it is preferable that the equation to quantize the magnitude of the normalized gradient is given as $QMoG(x,y)=$ Quantization[NRMG(x,y)], $0 \leq QMoG(x,y) \leq MaxQ$, where the level of maximum quantization is MaxQ, and the magnitude of the normalized gradient is $NRMG(x,y)=RMG(x,y) \times MaxQ$.

According to one embodiment of the present invention, it is preferable that the process is comprised of the following steps:

making a histogram upon evaluation of all of the quantized gradients;

making the accumulated histogram from the histogram for the multitude of the gradient;

thresholding based on the accumulated histogram; and labeling the thresholded image.

BRIEF DESCRIPTION OF THE DRAWINGS

Other objects and advantages of the invention will become apparent upon reading the detailed description and upon reference to the drawings.

DETAILED DESCRIPTION

The invention will be explained in detail with reference to the accompanying drawings. While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

The general method is followed to approximate between the reflection characteristic of the light on the object and the chromaticity coordinates of the reflected light.

Figure 1:
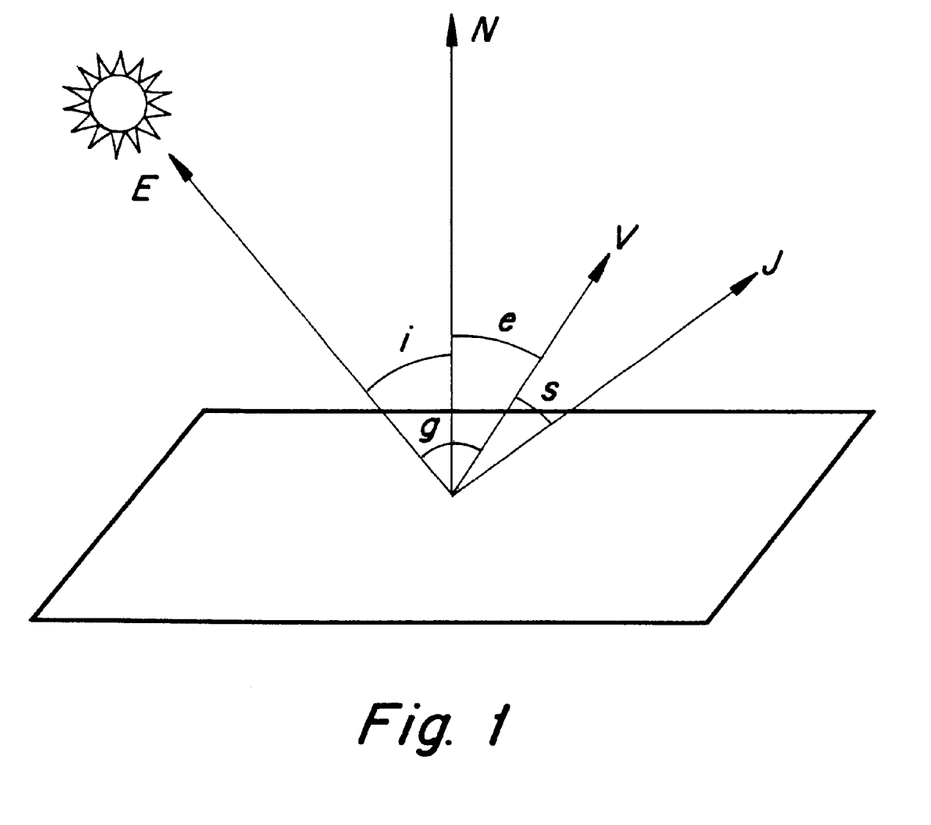
FIG. 1 illustrates the photometric angles of light.

It is well known in the field of computer science that the reflection characteristic of light of such nonhomogeneous materials as fallen leaves, skin, plastic, and the surface of a painted object is elucidated by a dichromatic reflection model as described, for example, in "Using Color to Separate Reflection Components", Steve A. Shafer, Color Research & Application 10, pp.210–218, 1985. The dichromatic reflection model represents the total radiance L as a combination of radiance $L_i$ and $L_b$, where L is the total radiance of light reflected from the surface of inhomogeneous dielectric materials with a photometric angle such as shown in FIG. 1, $L_i$ is the radiance of surface reflection, and $L_b$ is the radiance of body reflection. It is assumed in general that surface reflection has a color similar to illumination, or the same relationship of SPD (Relative Spectral Power Distribution).

FIG. 1 illustrates the relationship of the direction of illumination to nonhomogeneous dichromatic materials (E), the direction of a sensor in a color video camera (V), the normal direction at any position of object (N), and the ideal direction of the reflection (J).

The total radiance L of inhomogeneous dielectric materials has four parameters including the wavelength of light ($\lambda$), the angle (i) between the direction of illumination (E) and the normal direction (N) at any one position on the object, the angle (e) between the normal direction (N) and the direction of the sensor (V), and the angle (g) between direction of illumination (E) and the direction of the sensor (V). The angle (s) is an angle between the direction of the sensor (V) and the ideal direction (J).

The total radiance L of inhomogeneous dielectric materials is represented as a linear combination of $L_i$ and $L_b$ with the four parameters in the dichromatic reflection model as described in the following math equation 1:

$$L(\lambda,i,e,g)=L_i(\lambda,i,e,g)+L_b(\lambda,i,e,g) \quad \text{[Math Equation 1]}$$

The geometric components of angles i, e, g are determined considering the specific point of the surface. The dichromatic reflection model can be re-expressed based on the geometric components as described in the following math equation 2 to divide into a color term $(c_i(\lambda),c_b(\lambda))$ depending on wavelength and a geometric term $m(m_i,m_b)$ depending on the angle. In this case, $m_i$ and $m_b$ are considered as scalars.

$$L(\lambda)=m_i c_i(\lambda)+m_b c_b(\lambda)\text{tm} \quad \text{[Math Equation 2]}$$

Math equation 1 can be also represented as described in the following math equation 3, considering math equation 2.

$$L(\lambda,i,e,g)=L_i(\lambda,i,e,g)+L_b(\lambda,i,e,g)=m_i(i,e,g)c_i(\lambda)+m_b(i,e,g)c_b(\lambda)$$
[Math Equation 3]

The dichromatic reflection model is applicable to the explanation of light reflected from the surface of materials on the camera image with ease. The output equation of the camera for any SPD (Spectral Power distribution) of incidence is provided as tristimulus integration such as described in the following math equation 4.

[Math Equation 4]

$$C = \begin{bmatrix} R \\ G \\ B \end{bmatrix} = \begin{bmatrix} \int L(\lambda)\bar{r}(\lambda)d\lambda \\ \int L(\lambda)\bar{g}(\lambda)d\lambda \\ \int L(\lambda)\bar{b}(\lambda)d\lambda \end{bmatrix}$$

The above values of $\bar{r}(\lambda),\bar{g}(\lambda),\bar{b}(\lambda)$ mean the spectral sensitivities of the camera. The equation can be expressed as described by following math equation 5 summarizing the relationship between output color space of the camera and a dichromatic reflection model using the linear transformation characteristic of tristimulus integration.

[Math Equation 5]

$$C_L = \begin{bmatrix} R \\ G \\ B \end{bmatrix} = \begin{bmatrix} \int L(\lambda,i,e,g)\bar{r}(\lambda)d\lambda \\ \int L(\lambda,i,e,g)\bar{g}(\lambda)d\lambda \\ \int L(\lambda,i,e,g)\bar{b}(\lambda)d\lambda \end{bmatrix} = \begin{bmatrix} \int m_i c_i(\lambda)\bar{r}(\lambda)d\lambda + \int m_b c_b(\lambda)\bar{r}(\lambda)d\lambda \\ \int m_i c_i(\lambda)\bar{g}(\lambda)d\lambda + \int m_b c_b(\lambda)\bar{g}(\lambda)d\lambda \\ \int m_i c_i(\lambda)\bar{b}(\lambda)d\lambda + \int m_b c_b(\lambda)\bar{b}(\lambda)d\lambda \end{bmatrix}$$

When the following math equation 6 is proposed, the following math equation 7 can be derived from equation 6 to divide into $L_i$ and $L_b$, where $L_i$ is the surface reflection light and $L_b$ is the body reflection light.

$$C_L=[RGB]^T, C_i=[R_i G_i B_i]^T, C_b=[R_b G_b B_b]^T$$

$$R_i=\int c_i(\lambda)\bar{r}(\lambda)d\lambda, G_i=\int c_i(\lambda)\bar{g}(\lambda)d\lambda, B_i=\int c_i(\lambda)\bar{b}(\lambda)d\lambda$$

$$R_b=\int c_b(\lambda)\bar{r}(\lambda)d\lambda, G_b=\int c_b(\lambda)\bar{g}(\lambda)d\lambda, B_b=\int c_b(\lambda)\bar{b}(\lambda)d\lambda$$
[Math Equation 6]

where T is a transpose matrix.

$$C_L=m_i C_i+m_b C_b \quad \text{[Math Equation 7]}$$

where $m_i, m_b$ represent the magnitude of reflection at each pixel, $C_L$ is the output color from camera, $C_i$ is the surface reflection color, and $C_b$ is the body reflection color.

The math equation 8 is represented with R, G, and B terms to explain the output signal of the camera on chromaticity coordinates.

[Math Equation 8]

$$\begin{bmatrix} R \\ G \\ B \end{bmatrix} = m_i \begin{bmatrix} R_i \\ G_i \\ B_i \end{bmatrix} + m_b \begin{bmatrix} R_b \\ G_b \\ B_b \end{bmatrix}$$

The math equation 9 indicates the chromaticity coordinates of surface reflection light and body reflection light.

[Math Equation 9]

$$(r_i, g_i) = \left(\frac{R_i}{K_i}, \frac{G_i}{K_i}\right), (r_b, g_b) = \left(\frac{R_b}{K_b}, \frac{G_b}{K_b}\right)$$

where $K_i = R_i + G_i + B_i$, $K_b = R_b + G_b + B_b$

Therefore the chromaticity coordinate (r, g) for any point $[R\ G\ B]^T$ is represented as described in the following math equation 10.

[Math Equation 10]

$$r = \frac{(m_i R_i + m_b R_b)}{(m_i K_i + m_b K_b)}, g = \frac{(m_i G_i + m_b G_b)}{(m_i K_i + m_b K_b)}$$

Math equation 11 is represented with terms $(r_i, g_i)$ and $(r_b, g_b)$ from the math equation 10.

[Math Equation 11]

$$r = r_i \left[\frac{m_i K_i}{(m_i K_i + m_b K_b)}\right] + r_b \left[\frac{m_b K_b}{(m_i K_i + m_b K_b)}\right]$$

$$g = g_i \left[\frac{m_i K_i}{(m_i K_i + m_b K_b)}\right] + g_b \left[\frac{m_b K_b}{(m_i K_i + m_b K_b)}\right]$$

Math equation 11 is represented as described by the following math equation 12, where $\alpha = m_i K_i, \beta = m_b K_b$.

[Math Equation 12]

$$(r, g) = \left(r_i \left[\frac{\alpha}{\alpha + \beta}\right] + r_b \left[\frac{\beta}{\alpha + \beta}\right], g_i \left[\frac{\alpha}{\alpha + \beta}\right] + g_b \left[\frac{\beta}{\alpha + \beta}\right]\right)$$

Figure 2:
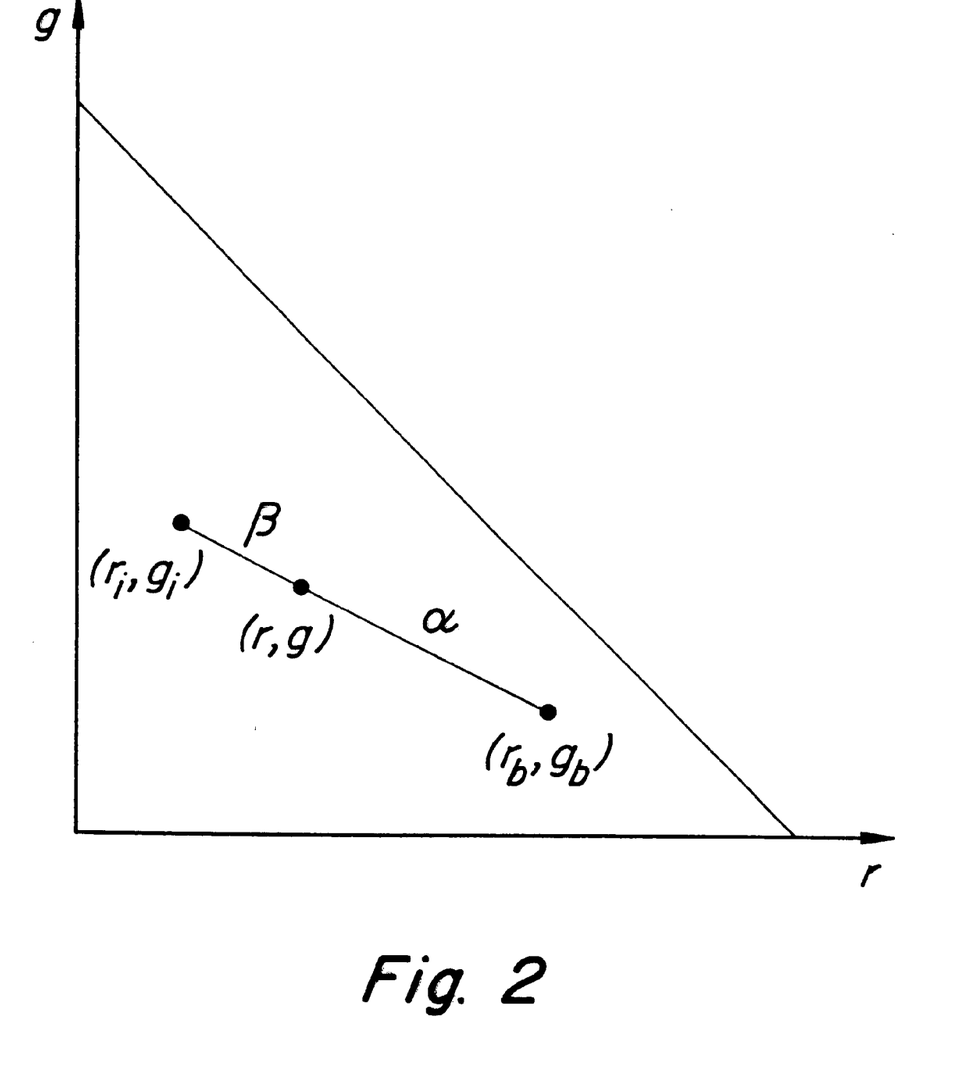
FIG. 2 illustrates the relationship of geometric parameters on the reflection parameter and the chromaticity diagram.

We can find that the point (r,g) with $[R\ G\ B]^T$ is on the segment linking $(r_i, g_i)$ and $(r_b, g_b)$, and that point divides the segment into α and β. This is illustrated in FIG. 2. Therefore if dielectric materials with surface reflection light from two objects exist, we can know easily that the intersection of the two segments from the two reflection lights is the common component of the two reflection lights, an illumination emitted externally, so the illumination color can be obtained from that intersection. This is because an illumination emitted to each of the other objects has the same chromaticity coordinate though it is reflected from the other objects. We can conclude that it is the illumination color if the component with the same coordinate is to be found among lots of components reflected from each of the other objects. In the real camera image, the distribution of camera output forms not a straight line but a distribution with a certain width because it is affected by photography noise, quantization noise, interreflection, and saturation of the sensor even for the surface reflection light. Therefore the process of performing approximation from the distribution should be included.

It is defined that a highlight point is a pixel for which surface reflection light ($L_i$) in a real image is not negligible, and a highlight area is the area focused on by the highlight point.

An object shining light brightly is so luminous that it overrides the dynamic range of the camera and the camera-clipping phenomenon makes the output of the camera to be clipped. Camera clipping is a phenomenon in which one color channel (R, G, B) for any pixel has the maximum value (255 in the case of an 8-bit/channel camera). The saturated area is the area showing the above phenomenon.

Figure 3:
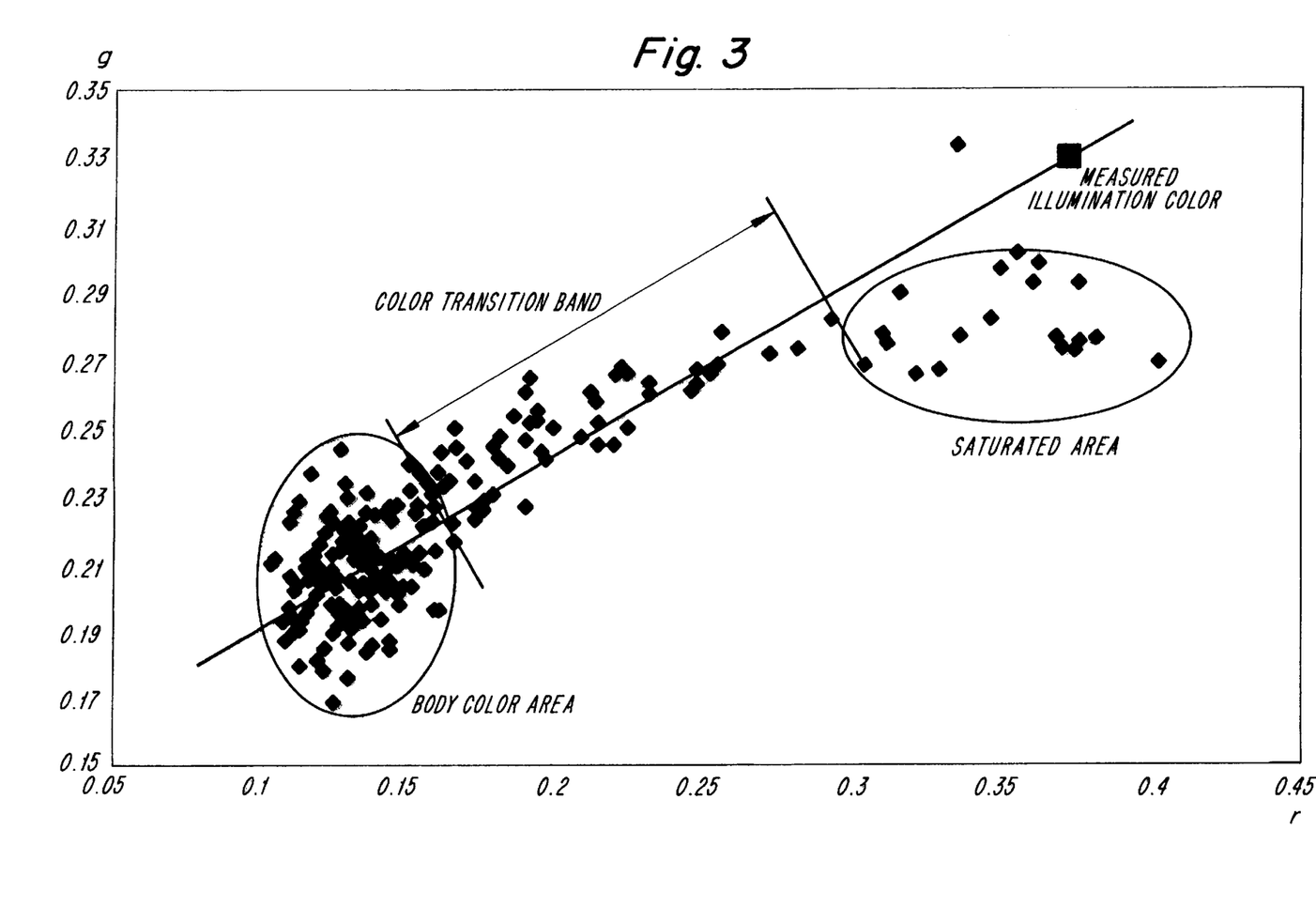
FIG. 3 illustrates the chroma distribution map of sampling pixels from the object selected from real images of a camera.

FIG. 3 shows an example of the distribution of sampling points on the chromaticity diagram from the highlight area to the area where the object color appears uniformly. The distribution on the r–g chromaticity diagram for measured color in practice is divided into three parts of saturated area, body color area, and color transition band. Therefore we can see easily that the method to solve this problem should be studied.

The present invention provides a method for finding the color transition band occurring between the object and a highlight and obtaining illumination color from the color transition band in the image using the above modeling method. The illumination information can be obtained easily from the color transition band occurring between the object and a highlight. The color transition band occurring between objects should be removed to find the information by setting the conditions of eigen values. The method for deciding the conditions of eigen values will be explained later. So the present invention can provide a method for solving the problem of excessive running time found in the previous method, and obtaining more accurate information of illumination color.

Figure 4A:
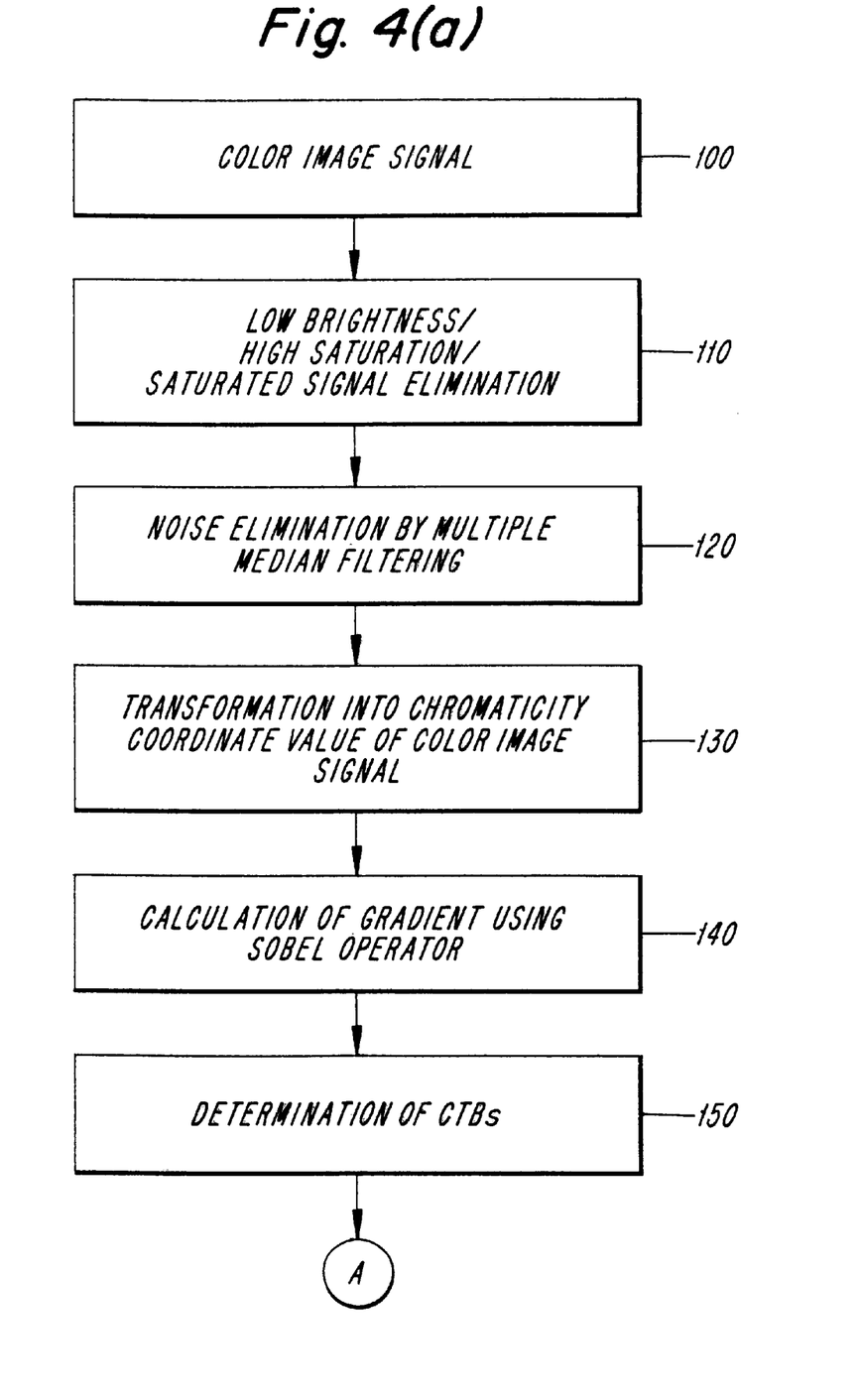
FIGS. 4(a) and 4(b) illustrate the flow charts of a method according to one embodiment of the present invention for detecting illumination color from an image signal.
Figure 4B:
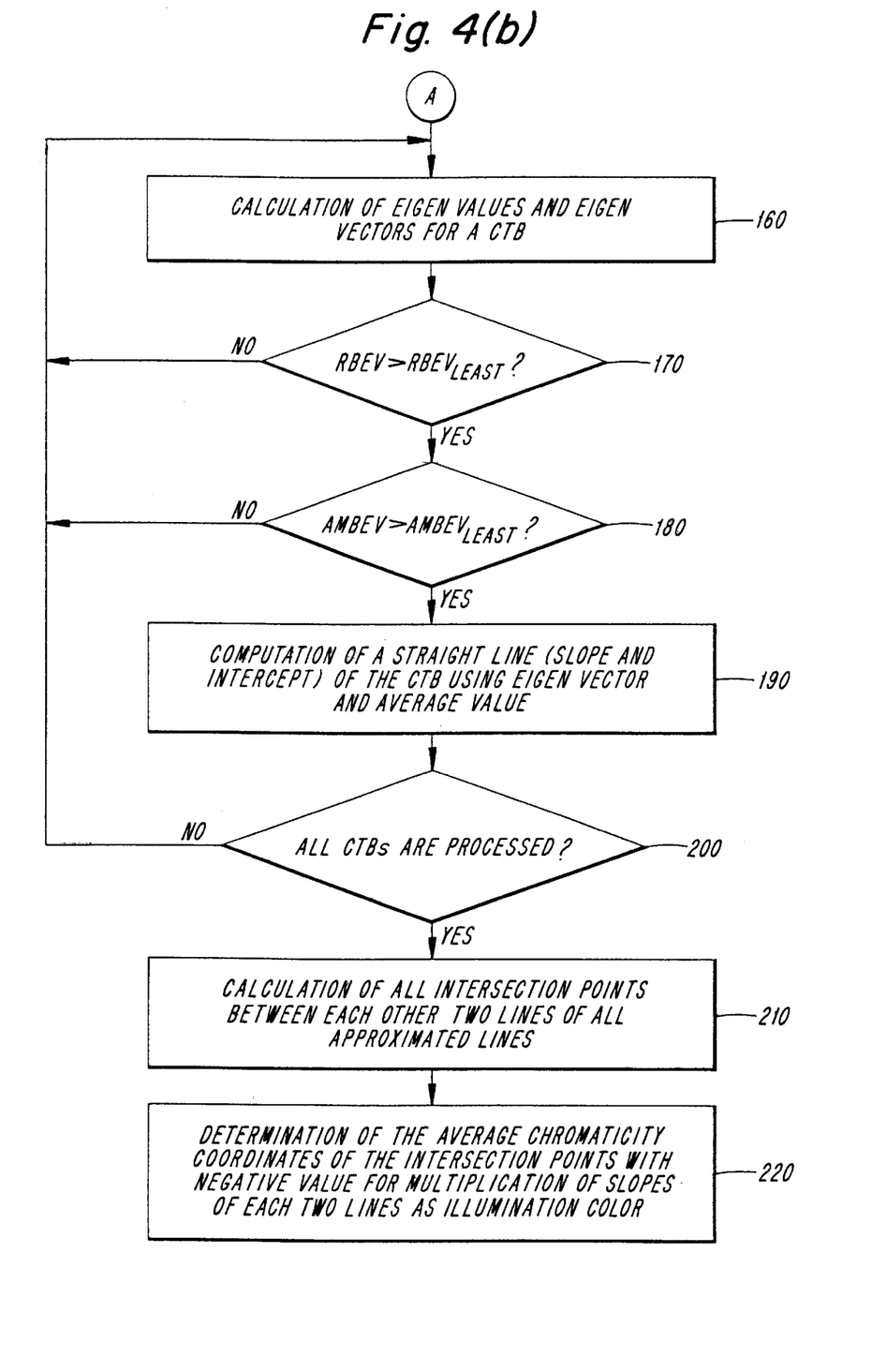

A method for detecting illumination color from an image signal according to one embodiment of the present invention will be explained in detail referring to FIGS. 4(a) and 4(b). FIGS. 4(a) and 4(b) illustrate flow charts showing the processes of the image signal processing to detect the illumination color according to the present invention. As illustrated above, the method for detecting illumination color from an image signal by the present invention comprises a process 100 of inputting the color image from an image input apparatus;

a process 110 of removing saturated signals, signals with low brightness, and signals with high chroma from the color image signal, i.e., setting their values to 0;

a process 120 of performing multistage median filtering to remove noise using maintenance of the edge information from images;

a process 130 of transforming color signals of R, G, B of all pixels of the input image into chromaticity coordinates;

a process 140 of calculating the magnitude of the gradient to get color edges from the chromaticity coordinates of images;

a process 150 of determining color transition bands, a process 160 of calculating eigen values and eigen vectors of each color transition band;

a process 170 of confirming if RBEV is greater than a first predetermined limit condition;

a process 180 of determining if AMBEV is greater than a second predetermined limit condition;

a process 190 of finding the linear approximation equation of the color transition band using the eigen vector corresponding to the BEV;

a process 200 of confirming if all color transition bands are processed;

a process 210 of calculating all intersection points between each other pair of two lines of all approximated lines; and a process 220 of determining the average chromaticity coordinates of the intersection points for each pair of lines for which a product of the slopes is negative as the illumination color.

A method for detecting illumination color from an image signal according to the present invention composed as stated above will be explained in detail referring to FIGS. 4(*a*) and 4(*b*). In process or step 110 the saturated signals, signals with low brightness, and signals with high chroma are removed, i.e. set to 0 from the input image signal. A signal with low brightness means a signal with a brightness (Y)<50, where Y=(R+G+B)/3. A saturated signal means a signal where the value of a term is 255 for any one of the R, G, B components. A signal with high chroma means the color signal outside a 0.6 PCC (a constant of chroma rates) triangle on the r–g chromaticity diagram.

The 0.6 PCC triangle is a triangle satisfying the following conditions. The PCC is defined as shown in the following math equation 13, where the central point of the chromaticity diagram is C(0.333, 0.333), the maximum points of r–g coordinates are $M_r(1,0)$ and $M_g(0,1)$, the origin is $M_o(0,0)$, and the segments linking those points and each point on the segment are as follows:

$\overline{CM_r}$ is the segment linking the C and the $M_r$,
$\overline{CM_g}$ is the segment linking the C and the $M_g$,
$\overline{CM_o}$ is the segment linking the C and the $M_o$,
$\overline{CA_r}$ is the segment linking the $A_r$ and C for any point $A_r$ on the segment linking C and $M_r$,
$\overline{CA_g}$ is the segment linking the $A_g$ and C for any point $A_g$ on the segment linking C and $M_g$, and $\overline{CA_o}$ is the segment linking the $A_o$ and C for any point $A_o$ on the segment linking C and $M_o$.

[Math Equation 13]

$$PCC = \frac{\overline{CA_r}}{\overline{CM_r}} = \frac{\overline{CA_g}}{\overline{CM_g}} = \frac{\overline{CA_o}}{\overline{CM_o}}$$

The 0.6 PCC triangle is defined as a triangle with three endpoints $A_r$, $A_g$, and $A_o$ satisfying PCC=0.6.

Process 120 of FIG. 4(*a*) performs multistage median filtering to remove noise as a maintenance step of the edge information in the image. Such an average filter can be used to remove noise, but this linear filter with a narrow bandwidth tends to crash sensitive information like lines or corners of image, or obscure the edges. A linear filter with narrow bandwidth is apt to remove noises effectively maintaining the edge of image and detailed information. A median filter is a typical linear filter. But the detailed information is damaged by the median filter with a larger window (more than 5×5). That destroys the information for the structure and the space of the image.

The multistage median filter created considering the information for the structure of the image is a modified form of median filter. The multistage median filter uses a sub-filter sensitive to the horizontal, vertical, diagonal directions, so that it can maintain the detailed information of each direction.

For the input $x_{ij}$ on the position of pixel (ij), the output $y_{ij}$ of the multistage median filter with the size of (v×v) window is represented as described in the following math equation 14.

$y_{ij}=\text{med}(\text{med}(z_1,z_2,x_{ij}),\text{med}(z_3,z_4,x_{ij}),x_{ij})$ $z_1=\text{med}(x_{i,j-v}, \ldots, x_{ij}, \ldots, x_{i,j+v})$ $z_2=\text{med}(x_{i-v,j}, \ldots, x_{ij}, \ldots, x_{i+v,j})$ $z_3=\text{med}(x_{i+v,j-v}, \ldots, x_{ij}, \ldots, x_{i-v,j+v})$ $z_4=\text{med}(x_{i-v,j-v}, \ldots, x_{ij}, \ldots, x_{i+v,j+v})$ [Math Equation 14]

where med means median.

Process 130 of FIG. 4(*a*) converts the color signal into chromaticity coordinates for all of the pixels of the input image by using the following math equation 15.

[Math Equation 15]

$$r = \frac{R}{(R+G+B)}, g = \frac{R}{(R+G+B)}$$

Process 140 of FIG. 4(*a*) calculates the multitude of the gradient to get the edge of color on the chroma diagram. When f(x,y) is defined as the light magnitude function for any position (x,y) in the image, the gradient of the pixel and the vector is represented as described in the following math equation 16.

Gradient: $\nabla f(x,y)=[\partial f/\partial x \partial f/\partial y]^T \equiv [f_x, f_y]^T$ A gradient magnitude: $e(x,y)=\sqrt{f_x^{2(x,y)}+f_y^{2(x,y)}}$ [Math Equation 16]

Two masks ∂ performing each partial derivatives $f_x$, $f_y$ for the direction of x and y in math equation 16 is called a sobel operator, used in the field of digital image processing generally. The magnitude of the gradient is calculated for each r, g with the application of this mask to chromaticity coordinates in f(x,y) image, and the magnitude of the gradient in f(x,y) image is defined as the average of the magnitudes of the gradients for r, g.

The position (x, y) of the image is the same definition as the position explained in process 120.

The image is made using the magnitude for the overall pixels calculated with the above method, and it is called a gradient image.

The process making the gradient color image will be explained in more detail as follows:

(1) Calculation of the gradient magnitude of all pixels:

$$M_oG = \frac{e_r(x,y)+e_g(x,y)}{2}$$

where $e_r(x,y), e_g(x,y)$ is equal to the gradient magnitude for r, g respectively.

(2) Equalization of the gradient magnitude:

$$RMG = \frac{MoG(x,y)}{MaxMOG}$$

where MaxMoG: the largest gradient magnitude in the overall color image.

(3) Quantization of the equalized gradient magnitude:

$NRMG(x,y)=RMG(x,y)\times\text{Max}Q$ where MaxQ: the largest quantization level.
In the case where the gradient magnitude value is shown to have an infinitesimal change down to a decimal fraction in the maximum value, in the quantization process taking a new interval by expanding the values, the more the maximum value is determined arbitrarily by a user, the more it is possible to express minutely.

That is, the color transition determined by the quantized value of the gradient determined here is more accurate.

$QMoG(x,y)=\text{quantization}[NRMG(x,y)]$ where $0 \leq QMoG(x,y) \leq \text{Max}Q$ (4) Making a gradient color image with the magnitude of the quantized gradient.

Process 150 in FIG. 4(*a*) decides the color transition band and is divided into sub-processes such as thresholding and labeling. The process will be explained in more detail as follows.

(1) Finding the histogram by appraising the quantized gradient magnitude of overall pixels:

$$\text{for } (k = 0; k <= MaxQ; k++)$$
$$\text{if } (QMoG\ (x, y) == k)$$
$$\text{histogram}[k]++$$

The magnitude of histogram[k] for any k represents the pixel number having the k magnitude of QMoG (x,y) in the color image.

In the case where the maximum quantization level is 255, if QMoG (x,y) in the position of any pixel (x,y) in the color image is 100 and the pixel having this is 30, the histogram [100] value is 30.

As noted above, if QMoG (x,y) value is 100, the color change quantity around the (x,y) own pixel position at present represents having a half of the color change quantity (100/255) as compared with a point having the maximum color change quantity in the overall color image.

In other words, QMoG(x,y) is the number representing the color change quantity in an arbitrary pixel.

Histogram [k] is the overall pixel number having the value showing the color change quantity called k in the overall color image.

(2) Making the accumulated histogram from the histogram for the gradient magnitude:

$$\text{For } (k = 0; k < MaxQ; k++)$$
$$\text{Accumulated\_histogram}[k] = \sum_{i=0}^{k} \text{histogram}[i]$$

Accumulated_histogram[k] adds all the histograms of smaller k than its own in the specific k. This is the value showing the overall pixel number where the number showing the color change extent in the overall color image is smaller than the specific k.

(1) Thresholding based on the accumulated histogram:
The thresholding process is as follows:

① Establishing the value of the correlative magnitude (MRCT) based on the accumulated histogram of the maximum color transition by the body color reflection of an object:

MRCT is the value representing the specific pixel ratio for the overall pixel number as the standard of the color change quantity. In this case, it means the image overall ratio for the pixel in which there is no particular color change quantity.

In the case of MRCT=0.3 (range 0~1.0), it means that the pixel contained 30% as the standard of the color change quantity in the overall pixel and is not included in the value showing the color transition. It also means that the pixel as noted above is regarded as an object color change having the same color by the noise of a camera. Therefore, this value has to be considered differently according to the specific noise characteristics of the camera. That is, it is useful that determination of the proper value raises accuracy of the illumination color prediction.

② Establishing the minimum k (Mink) satisfying Accumulated_histogram [MaxQ] * MRCT≦Accumulated_histogram[k] into thresholding of QMoG(x,y) of the quantized gradient magnitude:

The threshold is determined for eliminating the color change of the object color having the same color made by the camera's own noise.

③ Making the thresholding color image by achieving thresholding for the gradient color image:

If($QMoG(x, y)$ < Mink)

$QMoG(x, y) = 0$

Else $QMoG(x, y) = 255$ (2) Performing of labeling for the thresholded color image:

① Attachment of the same label as a blob coloring method [Dana H. Ballard & Christopher M. Brown, "Computer Vision", Prentice-Hall Inc., incorporated herein by reference] using an L-shaped template for mutual connected pixels in the thresholded pixel.

In this case, the used blob color is one of the image processing methods working to attach the same label between the pixels connected with each other and being applied to a binary image. In the function to connect white pixels connected with each other in the binary image, the image passing through the thresholding process becomes the binary image. This method connects pixels with each other in a method wherein the pixels are regarded to be connected with each other if the pixel above left of the present white pixel is white.

As noted above, the pixels to which the same label attaches provide the position information in the image. In each pixel position, the chromaticity value of the pixel having been saved already in the other memory device is obtained and used as the chromaticity value of the color transition band.

② We call an assemblage of each pixel having the same label a color transition band.

③ The chromaticity coordinate of each pixel determined to be a constituent of the color transition band is established as the chromaticity data of the color transition band.

Accordingly, the color transition band is generated through this process.

In process 160 of FIG. 4(*b*), the eigen values and the eigen vector for each color transition band are calculated by using a principle component analysis, to approximate a straight line for the color transition band consisting of points on the chromaticity diagram.

(1) On the assumption of a color transition band composed of n number of pixels, in the case of composing a matrix $X_{n \times 2}$ for r, g values of each pixel as the values subtracting it by obtaining the average value of r, g respectively, it is possible that one color transition band is expressed as follows:

$$X_{n \times 2} = \begin{bmatrix} r_1 & \cdots & r_n \\ g_1 & \cdots & g_n \end{bmatrix}^T,$$

where n is the number of the pixel, and T is a transpose of the given matrix.

(2) If a covariance matrix is called $C_{2 \times 2}$ then it could be expressed as follows:

$$C_{2 \times 2} = \left(\frac{1}{n-1}\right) X^T X$$

(3) In this case, all eigen values of the convariance matrix are expressed as a diagonal matrix $V=[v_1\ v_2]$ and the eigen vector corresponding to this is expressed as a matrix $W=[w_1 \ w_2]$ in the case that the square matrix W and the diagonal matrix V exist when one square matrix C exists.

The matrix W satisfying this equation is called an eigen value.

$$CW = WV, \text{ where } W = [w_1 \ w_2] = \begin{bmatrix} w_{1r} & w_{2r} \\ w_{1g} & w_{2g} \end{bmatrix} V = \begin{bmatrix} v_1 & 0 \\ 0 & v_2 \end{bmatrix}$$

(4) The eigen vector corresponding to the eigen value $v_1$ is $w_1$ and the eigen vector corresponding to the eigen value $v_2$ is $w_2$.

A Singular Value Decomposition (SVD) is a well-known method used in the field of statistics in order to seek an eigen value and the eigen vector. Specifically in the case that C is not a square matrix, the SVD is used for obtaining the W, V satisfying the above equation.

In process 170 of FIG. 4(b), the Bigger Eigen Value (BEV) of the obtained eigen values is used to determine which is greater than the predetermined limit condition as follows.

The Color Transition Band (CTB) generated between objects has to be removed because the illumination information can be obtained easily only from the Color Transition Band which is generated between an object and a highlight. In the comparison of process 170, if RBEV is less than or equal to the restriction or limit condition $RBEV_{LEAST}$, it returns to process 160, and if RBEV is greater than the limit condition, process 180 is performed.

The restriction or limit condition of process 170 is determined as follows.

(1) The ratio of BEV to the small eigen value in a given color transition band shows RBEV.

(2) The RBEV represents the straight characteristic, that is, RBEV represents a linearity of the color transition band.

The color transition band is regarded as the color transition band generated between an object and a highlight because reflection information for the illumination transmitted outside has a fixed pattern for various objects.

The minimum of the RBEV ($RBEV_{least}$) is determined and the limit condition is set using that minimum.

Process 180 of FIG. 4(b) decides whether an Absolute Magnitude of BEV (AMBEV) is greater than a predetermined limit condition. If AMBEV is less than or equal to the limit condition $AMBEV_{LEAST}$, it returns to process 160 and processing for the other color transition bands continues and if AMBEV is greater than the limit condition, process 190 is performed.

The limit condition for the absolute value of BEV is determined as follows:

(1) AMBEV represents surface area of the distribution of all data, and the color transition band with too small a value can be disregarded.

(2) The minimum of AMBEV ($AMBEV_{least}$) is set, and it becomes a limit condition.

In processes 170 and 180, the setting of the threshold values, $BEV_{LEAST}$ and $AMBEV_{LEAST}$ depends on the application. That is, in the case of chip implementation, the values are set at the factory, and in the case of S/W implementation, the values are able to be set at the factory or at the beginning of a particular photo session.

Process 190 of FIG. 4(b) computes a linear approximation equation of a color transition band. From this equation, the slope and the intersection are obtained using the eigen vector corresponding to BEV.

(1) Eigen vector w is a value that represents the slope of the color transition band.

(2) For the color transition band found in process 160, the intersection of the straight line can be obtained if the center of the line is moved to the extent of the average of each r, g.

In process 200, it is confirmed that all of the color transition bands are processed. If all are processed then it proceeds to process 210 to calculate all intersection points between all other pairs of approximated lines (or color transition bands), otherwise process 160 is performed to find the color transition band for any other pixel. Then process 220 is performed to determine the final illumination color.

In process 210, the cross intersection points are obtained using all of the linear equations for the color transition bands from process 190. Only intersection points between two straight lines of which the product of slopes is negative are selected, and the other intersection points between two straight lines of which the product of slopes is positive are rejected. The reason is that the intersection is greatly changed even for the small error, if the difference of the approximation equation in the manner as is stated above, i.e. the difference of angles of the two straight lines is not large.

Therefore for the purpose of finding the intersection of the straight lines with a relatively large difference of angles, once the lines are found for which the product of the slopes is negative (or the small angle between two straight lines is more than a certain angle) and the intersection point of these two lines is found, these intersections become more accurate.

In process 220, the average chromaticity coordinates of the intersection points for each pair of lines for which the product of the slopes is negative is determined to be the illumination color.

As the present invention has been explained, it is clear to a person having ordinary skill in the art that various effective advances are practicable on the technical idea of this invention.

This invention reduces costs in manufacturing of the real-image input apparatus, for it does not need additional devices such as a light source detector used in the previous method. Also in contrast to the previous method demanding so much calculation time to get the illumination color from the image directly, this invention can shorten the image processing time, demanding less time and getting more accurate information of illumination color.

What is claimed is:

1. A method for detecting illumination color from a color image signal comprising the steps of:

inputting a color image signal from an image input apparatus;

removing saturated signals, signals with low brightness, and signals with high chroma from said color image signal;

performing multistage median filtering to remove noise using edge maintenance information from said color image signal;

transforming color signals R, G, B of all pixels of said color image signal into chromaticity coordinates;

calculating a magnitude of a gradient to get color edges from the chromaticity coordinates of said color image signal;

determining color transition bands as approximated lines;

calculating eigen values and corresponding eigen vectors of each color transition band;

determining if a ratio of a bigger eigen value to a total variance value is greater than a first predetermined limit condition;

determining if an absolute magnitude of the bigger eigen value is greater than a second predetermined limit condition;

finding a linear approximation equation of each color transition band using the eigen vector corresponding to said bigger eigen value;

determining if all color transition bands are processed;

calculating all intersection points between each pair of approximated lines; and determining the illumination color as average chromaticity coordinates of intersection points of each pair of two lines for which the product of the slopes is negative.

2. A method for detecting the illumination color from a color image signal as set forth in claim 1, wherein brightness Y of said signals with low brightness is smaller than 50, and Y=(R+G+B)/3, said signals with high chroma are color signals outside a 0.6 PCC triangle on an r–g chromaticity diagram and said saturated signals are signals wherein the value of an element among said three elements R, G, B is 255.

3. A method for detecting the illumination color from a color image signal as set forth in claim 2, wherein the PCC triangle defined as $$PCC = \frac{\overline{CA_r}}{\overline{CM_r}} = \frac{\overline{CA_g}}{\overline{CM_g}} = \frac{\overline{CA_o}}{\overline{CM_o}}$$

is a triangle which links $A_r$, $A_g$, and $A_o$ points determined according to the magnitude of specific PCC, where a center point on the r–g chromaticity diagram is C (0.333, 0.333), maximum points of r–g coordinates are $M_r(1,0)$ and $M_g(0,1)$, an origin point is $M_o(0,0)$, and a plurality of segments are defined such that:

$\overline{CM_r}$ is a segment linking the C and the $M_r$, $\overline{CM_g}$ is a segment linking the C and the $M_g$, $\overline{CM_o}$ is a segment linking the C and the $M_o$, $\overline{CA_r}$ is a segment linking the $A_r$ and C for any point $A_r$ on the segment linking C and $M_r$, $\overline{CA_g}$ is a segment linking the $A_g$ and C for any point $A_g$ on the segment linking C and $M_g$, and $\overline{CA_o}$ is a segment linking the $A_o$ and C for any point $A_o$ on the segment linking C and $M_o$.

4. A method for detecting the illumination color from a color image signal as set forth in claim 1, wherein said step of calculating the magnitude of the gradient to get color edges from the chromaticity coordinates of said color image signal comprises the steps of:

finding the magnitudes of the gradients of all pixels;

normalizing the magnitudes of the gradients;

quantizing the magnitudes of the normalized gradients; and making a gradient image from the magnitudes of the quantized gradients.

5. A method for detecting the illumination color from a color image signal as set forth in claim 4, wherein the step of finding the magnitudes of the gradients of all pixels is provided as the equation of $MoG(x,y)=[e_r(x,y)+e_g(x,y)]/2$, where the gradient is $\nabla f(x,y)=[\partial f/\partial x \ \partial f/\partial y]^T \equiv [f_x, f_y]^T$ for any position (x,y) of the image, the magnitude of the gradient is $e(x,y)=\sqrt{f_x^2(x,y)+f_y^2(x,y)}$, and the magnitude of the gradient is $e_r(x,y)$ or $e_g(x,y)$ for each r, g respectively.

6. A method for detecting the illumination color from a color image signal as set forth in claim 4, wherein the step of normalizing is provided as the equation $$RMG(x,y)=MoG(x,y)/MaxMoG$$

where MaxMoG is a maximum multitude gradient in the image, and MoG(x,y) is the gradient for all pixels.

7. A method for detecting the illumination color from a color image signal as set forth in claim 4, wherein the step of quantizing is provided as the equation $$QMoG(x,y)=\text{Quantization}[NRMG(x,y)], \ 0 \leq QMoG(x,y) \leq MaxQ$$

where MaxQ is a level of maximum quantization and the magnitude of the normalized gradient is NRMG(x,y)= RMG(x,y)×MaxQ.

8. A method for detecting the illumination color from a color image signal as set forth in claim 1, wherein said step of determining color transition bands comprises the steps of:

making a histogram upon evaluation of a multitude of quantized gradients associated with all pixels of the color image signal;

making an accumulated histogram from said histogram for the multitude of quantized gradients;

thresholding based on said accumulated histogram, thereby producing a thresholded image; and labeling the thresholded image.

9. A method for processing illumination color in a color image comprising the steps of:

finding color transition bands from the color image, wherein finding color transition bands from the color image comprises generating a gradient image from the color image, generating a thresholded image from the gradient image, and labeling the thresholded image wherein pixels are associated with one another to form color transition bands;

performing linear approximation from chromaticity coordinates of pixels involved in the color transition bands; and determining an average of intersections of straight lines and setting the average to be the illumination color;

wherein generating a gradient image comprises finding magnitudes of gradients of pixels of the color image;

normalizing the magnitudes of the gradients;

quantizing the magnitudes of the normalized gradients; and making the gradient image from the magnitudes of the quantized gradients.

10. A method for detecting the illumination color from a color image signal, comprising:

finding magnitudes of gradients of pixels of the color image signal;

normalizing the magnitudes of the gradients;

quantizing the magnitudes of the normalized gradients;

generating a histogram from the quantized gradients;

generating an accumulated histogram from said histogram for the multitude of gradients;

thresholding based on said accumulated histogram;

labeling the thresholded image, thereby generating color transition bands;

performing linear approximation from chromaticity coordinates of pixels involved in the color transition bands; and determining an illumination color based upon results of the linear approximations.

* * * * *